(12) United States Patent
Saito et al.

(10) Patent No.: US 8,670,480 B2
(45) Date of Patent: Mar. 11, 2014

(54) TRANSCODER

(75) Inventors: Makoto Saito, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 494 days.

(21) Appl. No.: 12/995,357

(22) PCT Filed: Mar. 12, 2009

(86) PCT No.: PCT/JP2009/054760
§ 371 (c)(1),
(2), (4) Date: Nov. 30, 2010

(87) PCT Pub. No.: WO2009/144991
PCT Pub. Date: Dec. 3, 2009

(65) Prior Publication Data
US 2011/0075737 A1 Mar. 31, 2011

(30) Foreign Application Priority Data
May 30, 2008 (JP) ................................ 2008-142978

(51) Int. Cl.
*H04N 7/26* (2006.01)
*G06K 9/46* (2006.01)

(52) U.S. Cl.
USPC .................................... 375/240; 375/E7.125

(58) Field of Classification Search
None
See application file for complete search history.

(56) References Cited

U.S. PATENT DOCUMENTS

| | | | |
|---|---|---|---|
| 6,282,242 B1 | 8/2001 | Isozaki et al. | |
| 6,493,388 B1 * | 12/2002 | Wang | 375/240.12 |
| 6,587,508 B1 * | 7/2003 | Hanamura et al. | 375/240.24 |
| 6,763,067 B2 * | 7/2004 | Hurst | 375/240.03 |
| 6,963,608 B1 * | 11/2005 | Wu | 375/240.03 |
| 2003/0016751 A1 * | 1/2003 | Vetro et al. | 375/240.16 |

(Continued)

FOREIGN PATENT DOCUMENTS

| | | |
|---|---|---|
| JP | 5 300492 | 11/1993 |
| JP | 10 290426 | 10/1998 |
| JP | 2006 246276 | 9/2006 |
| JP | 2006 332914 | 12/2006 |

OTHER PUBLICATIONS

International Search Report issued Jun. 9, 2009 in PCT/JP09/054760 filed Mar. 12, 2009.

*Primary Examiner* — Jay Patel
*Assistant Examiner* — Reza Aghevli
(74) *Attorney, Agent, or Firm* — Oblon, Spivak, McClelland, Maier & Neustadt, L.L.P.

(57) ABSTRACT

A generated code amount accumulation part adds up the amounts of generated codes of pictures in 1 GOP which are encoded up to the current stage. An upper limit code amount accumulation part adds up the upper limit amounts of codes of the pictures in the 1 GOP which are encoded up to the current stage. A transmission load of an image transmission system is taken into consideration in the setting of the upper limit amount of codes. An update ratio setting part outputs an update instruction to lower a target rate when the accumulated amount of generated codes exceeds the accumulated upper limit amount of codes. The update ratio setting part does not output the update instruction for lowering the target rate when the accumulated amount of generated codes does not exceed the accumulated upper limit amount of codes. A transcoder can predict whether or not there is a possibility that the load of transmitting image data will increase while each picture in 1 GOP is encoded.

10 Claims, 6 Drawing Sheets

(56) References Cited

U.S. PATENT DOCUMENTS

| | | | |
|---|---|---|---|
| 2007/0071097 A1* | 3/2007 | Koto | 375/240.12 |
| 2008/0013627 A1* | 1/2008 | Tahara et al. | 375/240.02 |
| 2008/0084925 A1* | 4/2008 | Rozen et al. | 375/240.01 |
| 2009/0074313 A1 | 3/2009 | Ogawa | |

\* cited by examiner

Fig. 2

(a) PARAMETER RELATING TO TARGET AMOUNT OF CODES

| | |
|---|---|
| OutputTargetRate | TARGET RATE |
| I : P : B | CODE AMOUNT RATIO |
| TargetGOP | TARGET AMOUNT OF CODES IN 1 GOP |
| TargetIpic | TARGET AMOUNT OF CODES OF I PICTURE |
| TargetPpic | TARGET AMOUNT OF CODES OF P PICTURE |
| TargetBpic | TARGET AMOUNT OF CODES OF B PICTURE |
| QstepIpic | QUANTIZATION STEP VALUE OF I PICTURE |
| QstepPpic | QUANTIZATION STEP VALUE OF P PICTURE |
| QstepBpic | QUANTIZATION STEP VALUE OF B PICTURE |

(b) PARAMETER RELATING TO UPPER LIMIT AMOUNT OF CODES

| | |
|---|---|
| OutputMaxRate | UPPER LIMIT RATE |
| I : P : B | CODE AMOUNT RATIO |
| LimitGOP | UPPER LIMIT AMOUNT OF CODES IN 1 GOP |
| LimitIpic | UPPER LIMIT AMOUNT OF CODES OF I PICTURE |
| LimitPpic | UPPER LIMIT AMOUNT OF CODES OF P PICTURE |
| LimitBpic | UPPER LIMIT AMOUNT OF CODES OF B PICTURE |

(c) PARAMETER RELATING TO AMOUNT OF GENERATED CODES

| | |
|---|---|
| OutputIpic | AMOUNT OF GENERATED CODES OF I PICTURE |
| OutputPpic | AMOUNT OF GENERATED CODES OF P PICTURE |
| OutputBpic | AMOUNT OF GENERATED CODES OF B PICTURE |

TRANSCODER

TECHNICAL FIELD

The present invention relates to a technique to reduce the load of transmitting image data in a transcoder which decodes an input image into a decoded image and encodes the decoded image into an output image.

BACKGROUND ART

Image processing techniques are widely used since the techniques allow reduction in the load of transmitting image data. Encoders encode input images into output images, to thereby reduce the load of transmitting image data. Transcoders decode input images into decoded images and encode the decoded images into output images, to thereby further reduce the load of transmitting the image data.

The transcoders, however, sometimes encode fine decoded images. Further, the transcoders sometimes encode decoded images which perform active motion. In some cases, therefore, the transcoders cannot reduce the load of transmitting the image data. Then, by applying the technique disclosed in Patent Document 1, the transcoders can reduce the load of transmitting the image data in the following manner.

In a first method, a transcoder uses a decoded image and a reference image for which no motion compensation is made, to thereby calculate a motion vector of the decoded image. Subsequently, the transcoder uses the decoded image and a reference image for which motion compensation is made, to thereby calculate a prediction error of the decoded image. The transcoder further encodes the motion vector and the prediction error of the decoded image.

In a second method, the transcoder does not use a decoded image and a reference image for which no motion compensation is made and sets "0" to a motion vector of the decoded image. Subsequently, the transcoder does not use the decoded image and a reference image for which motion compensation is made and sets "0" to a prediction error of the decoded image. The transcoder further encodes the motion vector and the prediction error of the decoded image.

In the first method, if a fine decoded image or a decoded image of active motion is encoded, the amount of codes of the motion vector and the amount of codes of the prediction error become larger. In the second method, even if a fine decoded image or a decoded image of active motion is encoded, the amount of codes of the motion vector and the amount of codes of the prediction error do not become larger.

The transcoder estimates whether or not a buffer of a sender or a transmission destination which temporarily stores the image data will overflow and determines whether or not to output the motion vector and the prediction error of the decoded image which are calculated by the first or second method.

Even when the motion vector and the prediction error of the decoded image which are calculated by the first method are outputted, if the transcoder estimates that the buffer of the sender or the transmission destination will not overflow, the transcoder outputs the motion vector and the prediction error of the decoded image which are calculated by the first method. Therefore, the transcoder can perform more accurate motion compensation prediction.

When the motion vector and the prediction error of the decoded image which are calculated by the first method are outputted, if the transcoder estimates that the buffer of the sender or the transmission destination will overflow, the transcoder outputs the motion vector and the prediction error of the decoded image which are calculated by the second method. Therefore, the transcoder can reduce the load of transmitting the image data.

[Patent Document 1] Japanese Patent Application Laid Open Gazette No. 5-300492

When the transcoder estimates that the buffer of the sender or the transmission destination will not overflow, however, the transcoder continues to output the motion vector and the prediction error of the decoded image which are calculated by the first method until the transcoder next estimates that the buffer of the sender or the transmission destination will overflow. In other words, the transcoder cannot predict in advance that there is a possibility of overflow until the overflow actually occurs.

DISCLOSURE OF INVENTION

The present invention is intended for a transcoder comprising a decoder for decoding an input image to generate a decoded image and an encoder for encoding a decoded image to generate an output image. According to an aspect of the present invention, the transcoder further comprises an upper limit rate setting part for setting an upper limit rate which is an upper limit value of an output rate, a target rate setting part for setting a target rate which is a target value of the output rate, a rate comparison part for comparing a generation rate which is an actually measured value of the output rate with the upper limit rate, and a target rate resetting part for resetting the target rate when the generation rate exceeds the upper limit rate, to thereby cause a generation rate after resetting the target rate not to exceed the upper limit rate.

It becomes possible to predict in advance that there is a possibility of overflow before the overflow actually occurs.

According to another preferred embodiment of the present invention, the transcoder of the present invention comprises an upper limit code amount setting part for setting the upper limit amount of codes, which is an upper limit value of the amount of outputted codes per predetermined unit of image, on the basis of the upper limit rate, and a target code amount setting part for setting the target amount of codes, which is a target value of the amount of outputted codes per the predetermined unit of image, on the basis of the target rate, and in the present invention, the rate comparison part includes a partial code amount comparison part for comparing the amount of partially generated codes, which is an actually measured value of the amount of outputted codes of encoded images per the predetermined unit of image, with the upper limit amount of partial codes, which is an upper limit value of the amount of outputted codes of the encoded images per the predetermined unit of image, and the target rate resetting part includes an image unit target rate resetting part for resetting the target rate when the amount of partially generated codes exceeds the upper limit amount of partial codes, to thereby cause the amount of generated codes, which is an actually measured value of the amount of outputted codes per the predetermined unit of image not to exceed the upper limit amount of codes.

It becomes possible to predict in advance whether or not there is a possibility of overflow concurrently with the encoding of the image data which is performed by using one path, without prefetching the image data by using two paths.

Therefore, it is an object of the present invention to provide a technique to predict in advance that there is a possibility that the load of transmitting the image data will increase in a transcoder which decodes an input image into a decoded image and encodes the decoded image into an output image.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a view showing parameters relating to various types of amounts of codes;

BEST MODE FOR CARRYING OUT THE INVENTION

{Constituent Elements of Transcoder}

Figure 1:
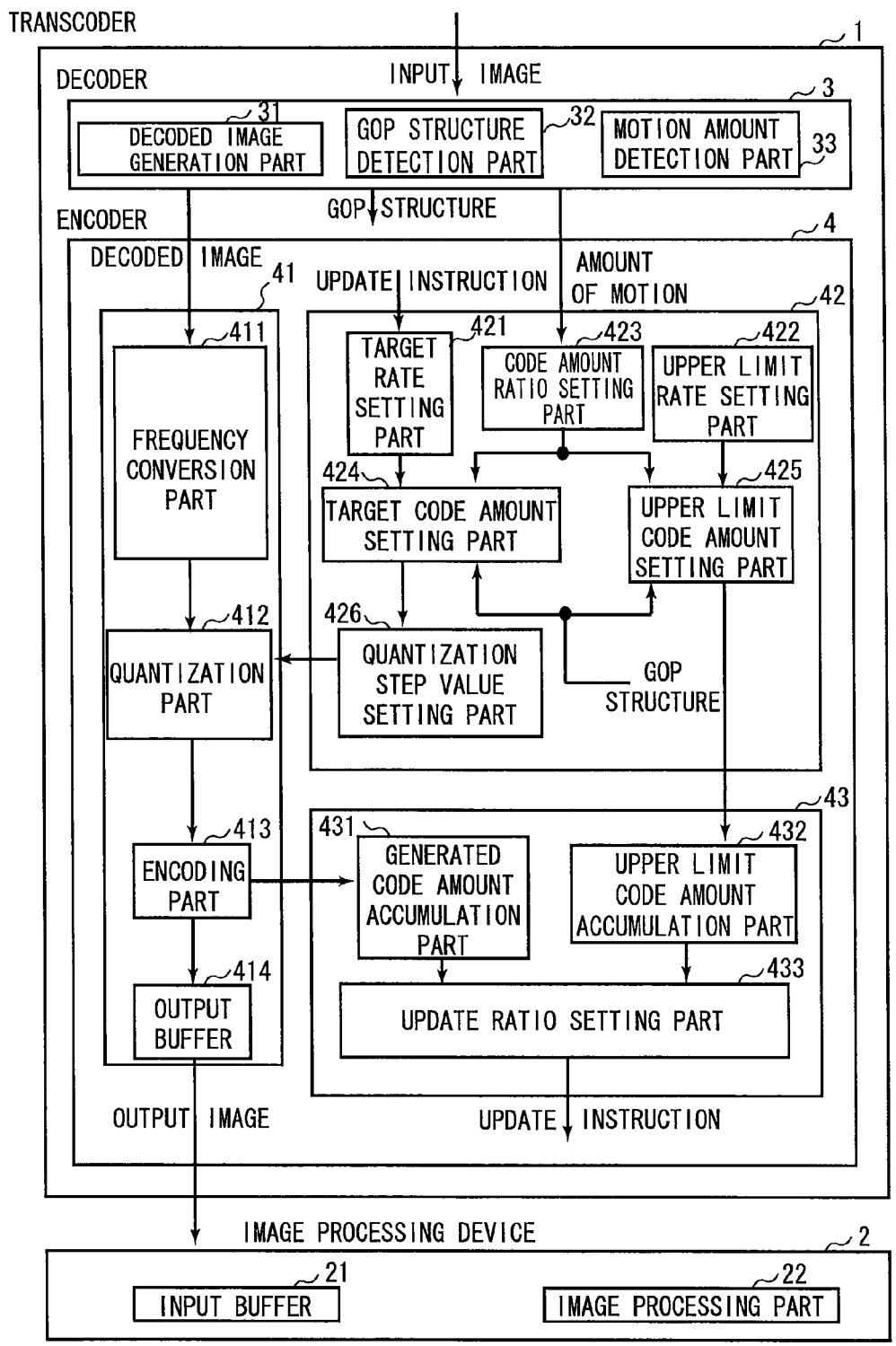
FIG. 1 is a block diagram showing constituent elements of an image transmission system.

Hereinafter, with reference to figures, a preferred embodiment of the present invention will be discussed. FIG. 1 is a block diagram showing constituent elements of an image transmission system. The image transmission system is constituted of a transcoder 1, an image processing device 2, a not-shown transmission path, and the like.

The transcoder 1 decodes an input image by using a decoder 3 in accordance with a first coding system, to thereby generate a decoded image. The transcoder 1 encodes the decoded image by using an encoder 4 in accordance with a second coding system, to thereby generate an output image. The first and second coding systems may be different coding systems or the same coding system.

The image processing device 2 inputs the output image generated by the transcoder 1 and stores the output image into an input buffer 21. The image processing device 2 processes the output image generated by the transcoder 1 in an image processing part 22. The transcoder 1 and the image processing device 2 are connected to each other with the not-shown transmission path.

The decoder 3 is constituted of a decoded image generation part 31, a GOP structure detection part 32, a motion amount detection part 33, and the like. The decoded image generation part 31 decodes the input image in accordance with the first coding system to generate the decoded image. The GOP structure detection part 32 detects a GOP structure of the decoded image. The motion amount detection part 33 detects the amount of motion of the decoded image, which indicates the degree of the motion of the decoded image.

The encoder 4 is constituted of an output image generation part 41, an initialization part 42, an update setting part 43, and the like. The output image generation part 41 encodes the decoded image in accordance with the second coding system, to thereby generate the output image. The initialization part 42 initializes a target rate. The update setting part 43 updates the initialized target rate.

The output image generation part 41 is constituted of a frequency conversion part 411, a quantization part 412, an encoding part 413, an output buffer 414, and the like.

The frequency conversion part 411 performs the frequency conversion on the decoded image inputted to the encoder 4. The quantization part 412 quantizes the decoded image of which the frequency conversion is performed. The encoding part 413 encodes the quantized decoded image. The output buffer 414 temporarily stores therein the output image outputted from the encoder 4.

The initialization part 42 is constituted of a target rate setting part 421, an upper limit rate setting part 422, a code amount ratio setting part 423, a target code amount setting part 424, an upper limit code amount setting part 425, a quantization step value setting part 426, and the like.

The target rate setting part 421 sets the target rate which is a target value of an output rate. The target rate is so set as to be lower than an upper limit rate. The target rate is set, for example, by multiplying the upper limit rate by a predetermined ratio smaller than 1. The upper limit rate setting part 422 sets the upper limit rate which is an upper limit value of the output rate. The upper limit rate is set taking the transmission load of the image transmission system into consideration. The code amount ratio setting part 423 sets a ratio of the respective amounts of codes of I picture, P picture, and B picture. The code amount ratio is set taking the amount of motion into consideration.

The target code amount setting part 424 sets the respective target amounts of codes of the I picture, the P picture, and the B picture in 1 GOP. The target amount of codes is set taking the target rate, the code amount ratio, and the GOP structure into consideration. The upper limit code amount setting part 425 sets the respective upper limit amounts of codes of the I picture, the P picture, and the B picture in the 1 GOP. The upper limit amount of codes is set taking the upper limit rate, the code amount ratio, and the GOP structure into consideration. The quantization step value setting part 426 sets respective quantization step values of the I picture, the P picture, and the B picture in the 1 GOP. The quantization step value is set taking the target amount of codes into consideration and outputted to the quantization part 412.

The update setting part 43 is constituted of a generated code amount accumulation part 431, an upper limit code amount accumulation part 432, an update ratio setting part 433, and the like.

The generated code amount accumulation part 431 adds up the amounts of generated codes of images in the 1 GOP which are encoded up to the current stage. The amount of generated codes is inputted from the encoding part 413. The upper limit code amount accumulation part 432 adds up the upper limit amounts of codes of the images in the 1 GOP which are encoded up to the current stage. The upper limit amount of codes is inputted from the upper limit code amount setting part 425.

The update ratio setting part 433 compares the amount of generated codes and the upper limit amount of codes of the images in the 1 GOP which are encoded up to the current stage. When the amount of generated codes exceeds the upper limit amount of codes, the update ratio setting part 433 outputs an update instruction to the target rate setting part 421 in order to lower the target rate. When the amount of generated codes does not exceed the upper limit amount of codes, the update ratio setting part 433 does not output the update instruction to the target rate setting part 421 in order to maintain the target rate. An update ratio is the ratio of the updated target rate with respect to the target rate before updating.

FIG. 2(a) is a view showing parameters relating to the target amount of codes. The parameter "OutputTargetRate" is the target rate which is set by the target rate setting part 421. The parameter "I:P:B" is the code amount ratio which is set by the code amount ratio setting part 423.

The parameter "TargetGOP" is the target amount of codes of 1 GOP, which is set by the target code amount setting part 424. The parameters "TargetIpic", "TargetPpic", and "Target- Bpic" are the respective target amounts of codes of the I picture, the P picture, and the B picture, which are set by the target code amount setting part 424.

The parameters "QstepIpic", "QstepPpic", and "QstepBpic" are the respective quantization step values of the I picture, the P picture, and the B picture, which are set by the quantization step value setting part 426.

FIG. 2(*b*) is a view showing parameters relating to the upper limit amount of codes. The parameter "OutputMaxRate" is the upper limit rate which is set by the upper limit rate setting part 422. The parameter "I:P:B" is the code amount ratio which is set by the code amount ratio setting part 423.

The parameter "LimitGOP" is the upper limit amount of codes of 1 GOP, which is set by the upper limit code amount setting part 425. The parameters "LimitIpic", "LimitPpic", and "LimitBpic" are the respective upper limit amounts of codes of the I picture, the P picture, and the B picture, which are set by the upper limit code amount setting part 425.

FIG. 2(*c*) is a view showing parameters relating to the amount of generated codes. The parameters "OutputIpic", "OutputPpic", and "OutputBpic" are the respective amounts of generated codes of the I picture, the P picture, and the B picture, which are calculated by the encoding part 413.

{Operation Flow in Initialization Part}

Figure 3:
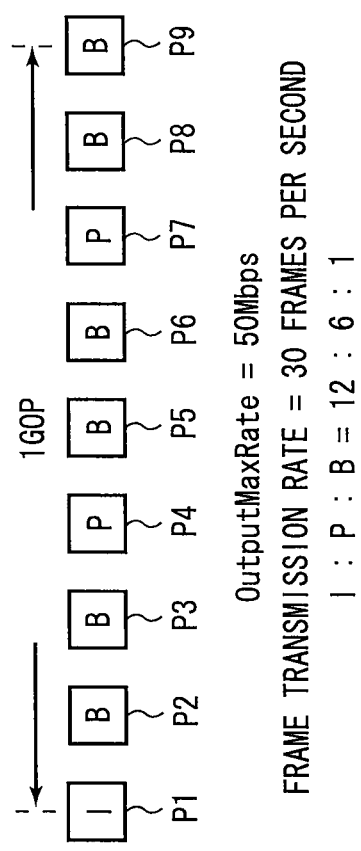
FIG. 3 is a view showing an operation of an initialization part.
Figure 4:
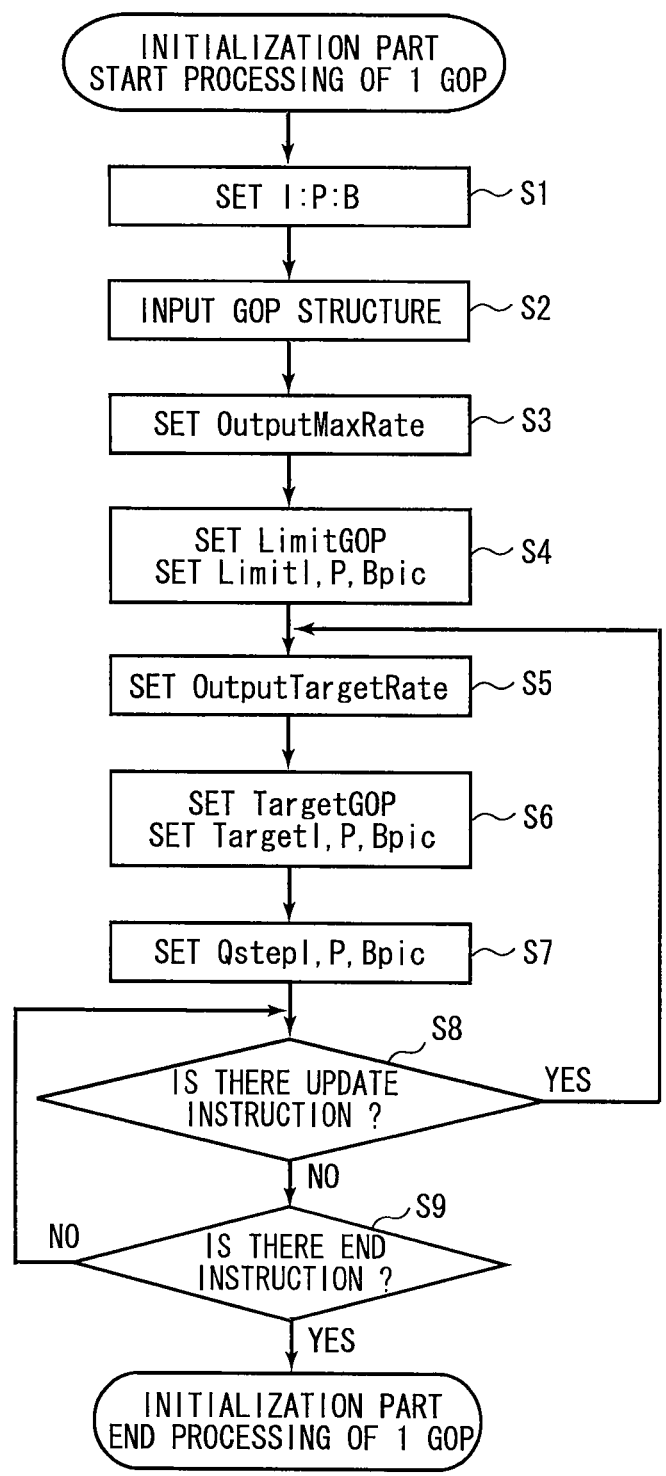
FIG. 4 is a flowchart showing an operation flow in the initialization part.

FIG. 3 is a view showing an operation of the initialization part 42. FIG. 4 is a flowchart showing an operation flow in the initialization part 42. In the following discussion, the processing of the 1 GOP shown in FIG. 3 will be discussed. The processings of other GOPs are performed in the same manner as discussed below.

The code amount ratio setting part 423 inputs the amount of motion from the motion amount detection part 33 and sets the I:P:B (Step S1). The target code amount setting part 424 and the upper limit code amount setting part 425 input the GOP structure from the GOP structure detection part 32 (Step S2).

The amount of motion is a standardized value obtained by dividing a sum value of the lengths of motion vectors or the amount of codes in all blocks of the decoded image by the number of all blocks in the decoded image. As to the I:P:B, it is desirable that when the amount of motion is small, the ratio of the I picture should be set high and the ratios of the P picture and the B picture should be set low. It is desirable that when the amount of motion is large, the ratio of the I picture should be set high and the ratios of the P picture and the B picture should be set higher than those in the case where the amount of motion is small. The I:P:B may be set for each scene or may be set for each GOP. In FIG. 3, it is set that the I:P:B=12:6:1.

The upper limit rate setting part 422 sets the OutputMaxRate (Step S3). The upper limit code amount setting part 425 inputs the OutputMaxRate from the upper limit rate setting part 422 and inputs the I:P:B from the code amount ratio setting part 423. The upper limit code amount setting part 425 sets the LimitGOP and further sets the LimitIpic, the LimitPpic, and the LimitBpic (Step S4).

The OutputMaxRate is set taking the transmission load of the image transmission system into consideration. As a first specific example, the OutputMaxRate is set taking the storage capacity of the output buffer 414 and the processing speed of the transcoder 1 into consideration. As a second specific example, the OutputMaxRate is set taking the storage capacity of the input buffer 21 and the processing speed of the image processing device 22 into consideration. As a third specific example, the OutputMaxRate is set taking the transmission rate of the transmission path not shown in FIG. 1 into consideration. In FIG. 3, it is set that the OutputMaxRate=50 Mbps.

The 1 GOP shown in FIG. 3 consists of 9 frames, and specifically consists of 1 frame of I picture P1, 2 frames of P pictures P4 and P7, and 6 frames of B pictures P2, P3, P5, P6, P8, and P9. The frame transmission rate is 30 frames per second (fps). The LimitGOP, the LimitIpic, the LimitPpic, and the LimitBpic are set as expressed by the following equations (1), (2), (3), and (4), respectively.

$$LimitGOP = 50 \text{ Mbps} \times \frac{9}{30/s} \qquad (1)$$
$$= 15 \text{ Mbit}$$

$$LimitIpic = 15 \text{ Mbit} \times \frac{12}{12 \times 1 + 6 \times 2 + 1 \times 6} \qquad (2)$$
$$= 6.0 \text{ Mbit}$$

$$LimitPpic = 15 \text{ Mbit} \times \frac{6}{12 \times 1 + 6 \times 2 + 1 \times 6} \qquad (3)$$
$$= 3.0 \text{ Mbit}$$

$$LimitBpic = 15 \text{ Mbit} \times \frac{1}{12 \times 1 + 6 \times 2 + 1 \times 6} \qquad (4)$$
$$= 0.5 \text{ Mbit}$$

The target rate setting part 421 sets the OutputTargetRate (Step S5). The target code amount setting part 424 inputs the OutputTargetRate from the target rate setting part 421 and inputs the I:P:B from the code amount ratio setting part 423. The target code amount setting part 424 sets the TargetGOP and further sets the TargetIpic, the TargetPpic, and the TargetBpic (Step S6).

Figure 5:
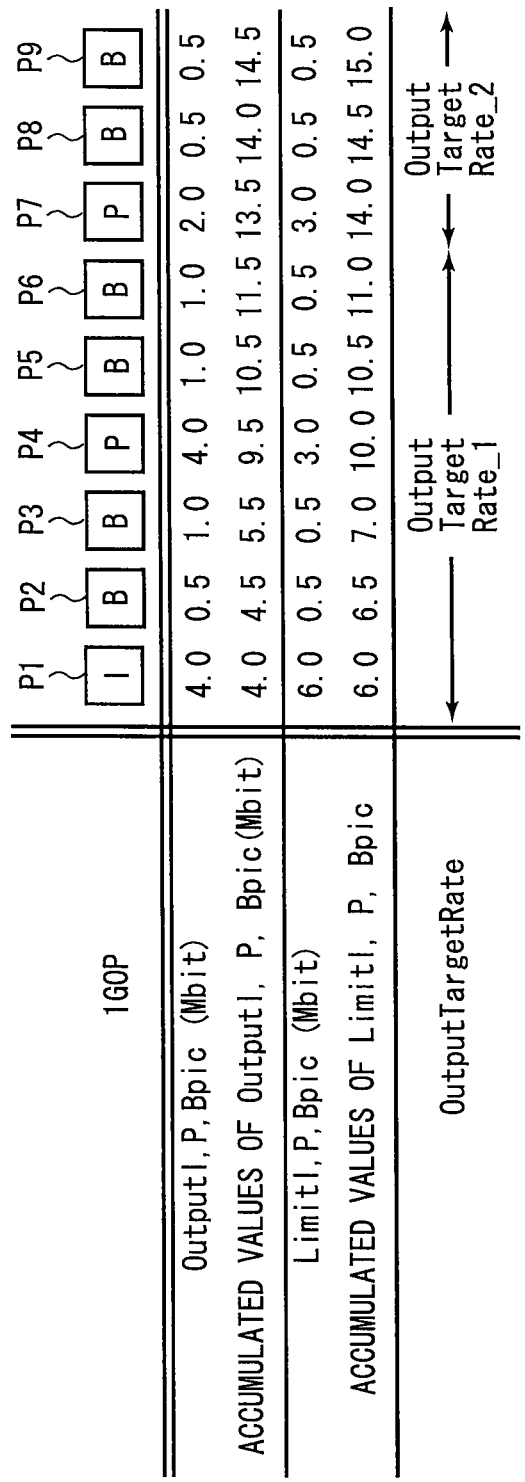
FIG. 5 is a view showing an operation of an update setting part.

The OutputTargetRate is set to be lower than the OutputMaxRate. In FIG. 5 discussed later, by multiplying the OutputMaxRate=50 Mbps by a predetermined ratio=0.6, the OutputMaxRate in the current stage is set to be OutputMaxRate_1=30 Mbps.

The TargetGOP, the TargetIpic, the TargetPpic, and the TargetBpic are set smaller than the LimitGOP, the LimitIpic, the LimitPpic, and the LimitBpic, respectively. The TargetGOP, the TargetIpic, the TargetPpic, and the TargetBpic are set as expressed by the following equations (5), (6), (7), and (8), respectively.

$$TargetGOP = 30 \text{ Mbps} \times \frac{9}{30/s} \qquad (5)$$
$$= 9 \text{ Mbit}$$

$$TargetIpic = 9 \text{ Mbit} \times \frac{12}{12 \times 1 + 6 \times 2 + 1 \times 6} \qquad (6)$$
$$= 3.6 \text{ Mbit}$$

$$TargetPpic = 9 \text{ Mbit} \times \frac{6}{12 \times 1 + 6 \times 2 + 1 \times 6} \qquad (7)$$
$$= 1.8 \text{ Mbit}$$

$$TargetBpic = 9 \text{ Mbit} \times \frac{1}{12 \times 1 + 6 \times 2 + 1 \times 6} \qquad (8)$$
$$= 0.3 \text{ Mbit}$$

The quantization step value setting part 426 inputs the TargetIpic, the TargetPpic, and the TargetBpic from the target code amount setting part 424 and sets the QstepIpic, the QstepPpic, and the QstepBpic (Step S7). The quantization step value setting part 426 outputs the QstepIpic, the QstepPpic, and the QstepBpic to the quantization part 412.

The target rate setting part 421 checks if the update ratio setting part 433 gives the update instruction thereto (Step S8). The target rate setting part 421 checks if the update ratio setting part 433 gives the end instruction thereto (Step S9). Steps S8 and S9 are executed both in the operation of the initialization part 42 and in the operation of the update setting part 43.

{Operation Flow in Update Setting Part}

Figure 6:
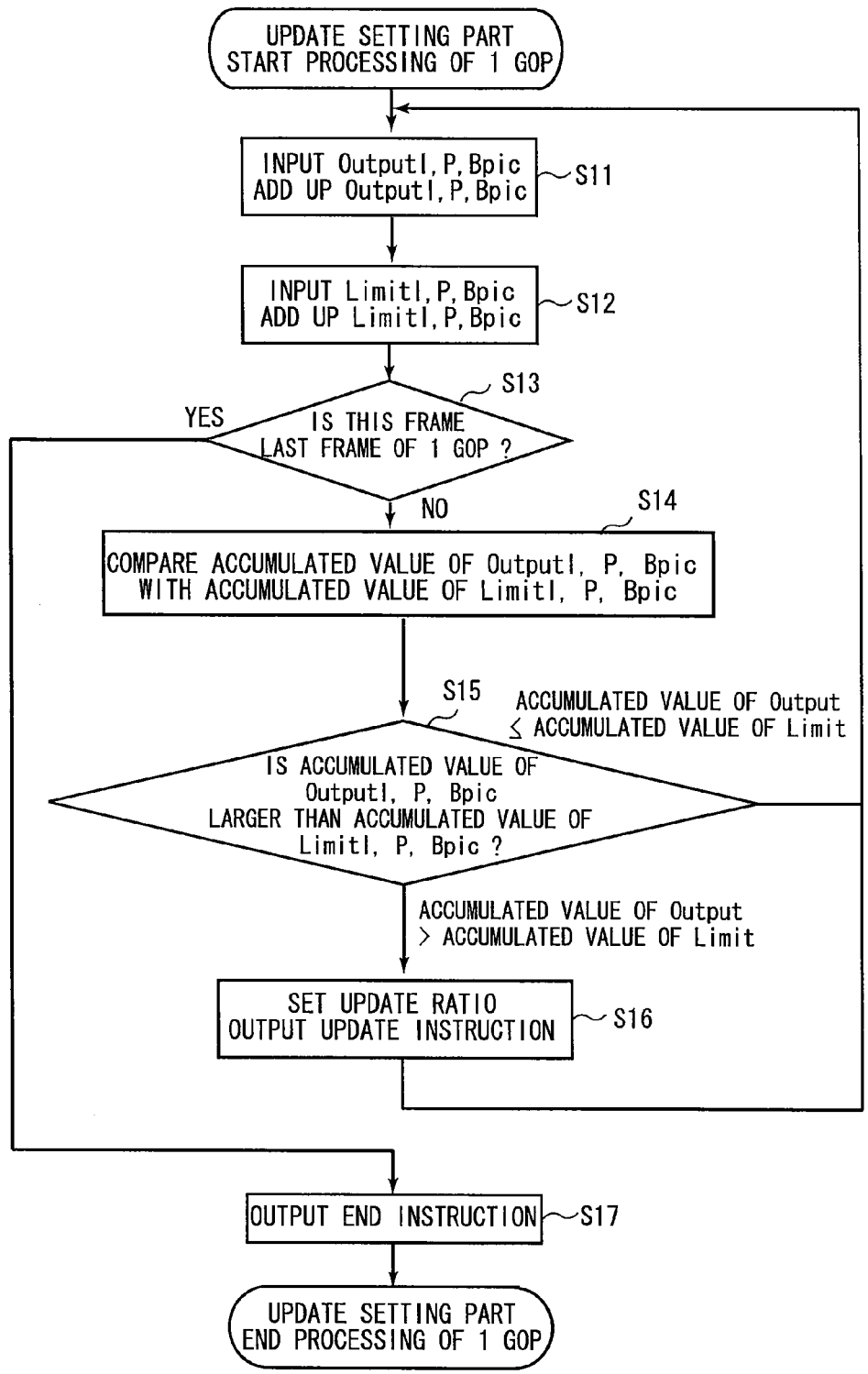
FIG. 6 is a flowchart showing an operation flow in the update setting part.

FIG. 5 is a view showing an operation of the update setting part 43. FIG. 6 is a flowchart showing an operation flow in the update setting part 43. In the following discussion, the processing of the 1 GOP shown in FIG. 3 will be discussed. The processings of other GOPs are performed in the same manner as discussed below. "Accumulated values of OutputI, P, Bpic" are values obtained by adding up the amounts of generated codes of the I picture, the P picture, and the B picture (the OutputI, P, Bpic) in the images in the 1 GOP which are encoded up to the current stage. "Accumulated values of LimitI, P, Bpic" are values obtained by adding up the upper limit amounts of codes of the I picture, the P picture, and the B picture (the LimitI, P, Bpic) in the images in the 1 GOP which are encoded up to the current stage.

The processing of the I picture P1 will be discussed. The generated code amount accumulation part 431 inputs the OutputIpic=4.0 Mbit of the I picture P1 from the encoding part 413 and calculates the accumulated value of OutputI, P, Bpic at 4.0 Mbit (Step S11). The upper limit code amount accumulation part 432 inputs the LimitIpic=6.0 Mbit of the I picture P1 from the upper limit code amount setting part 425 and calculates the accumulated value of LimitI, P, Bpic at 6.0 Mbit (Step S12). The I picture P1 is not the last frame of the 1 GOP ("NO" in Step S13).

The update ratio setting part 433 inputs the accumulated value of OutputI, P, Bpic=4.0 Mbit from the generated code amount accumulation part 431 and inputs the accumulated value of LimitI, P, Bpic=6.0 Mbit from the upper limit code amount accumulation part 432. The update ratio setting part 433 compares the accumulated value of OutputI, P, Bpic with the accumulated value of LimitI, P, Bpic (Step S14).

The accumulated value of OutputI, P, Bpic does not exceed the accumulated value of LimitI, P, Bpic ("ACCUMULATED VALUE OF Output≤ACCUMULATED VALUE OF Limit" in Step S15). In other words, at the point of time when encoding is completed up to the I picture P1 in the 1 GOP, the generation rate of this 1 GOP does not exceed the upper limit rate. The update ratio setting part 433 does not output the update instruction to the target rate setting part 421 in order to maintain the OutputTargetRate at the OutputTargetRate_1 of the current stage. The target rate setting part 421 receives neither the update instruction nor the end instruction ("NO" in Step S8 and "NO" in Step S9).

The processing of the B picture P2 will be discussed. The generated code amount accumulation part 431 inputs the OutputBpic=0.5 Mbit of the B picture P2 from the encoding part 413 and calculates the accumulated value of OutputI, P, Bpic at 4.5 Mbit (Step S11). The upper limit code amount accumulation part 432 inputs the LimitBpic=0.5 Mbit of the B picture P2 from the upper limit code amount setting part 425 and calculates the accumulated value of LimitI, P, Bpic at 6.5 Mbit (Step S12). The B picture P2 is not the last frame of the 1 GOP ("NO" in Step S13).

The update ratio setting part 433 inputs the accumulated value of OutputI, P, Bpic=4.5 Mbit from the generated code amount accumulation part 431 and inputs the accumulated value of LimitI, P, Bpic=6.5 Mbit from the upper limit code amount accumulation part 432. The update ratio setting part 433 compares the accumulated value of OutputI, P, Bpic with the accumulated value of LimitI, P, Bpic (Step S14).

The accumulated value of OutputI, P, Bpic does not exceed the accumulated value of LimitI, P, Bpic ("ACCUMULATED VALUE OF Output≤ACCUMULATED VALUE OF Limit" in Step S15). In other words, at the point of time when encoding is completed up to the B picture P2 in the 1 GOP, the generation rate of this 1 GOP does not exceed the upper limit rate. The update ratio setting part 433 does not output the update instruction to the target rate setting part 421 in order to maintain the OutputTargetRate at the OutputTargetRate_1 of the current stage. The target rate setting part 421 receives neither the update instruction nor the end instruction ("NO" in Step S8 and "NO" in Step S9).

The processings of the B picture P3, the P picture P4, the B picture P5 are the same as the processings of the I picture P1 and the B picture P2. In this case, in any one of the processings of the B picture P3 to that of the B picture P5, the relation of the value of OutputI, P, Bpic>the value of LimitI, P, Bpic holds, and in any one of the processings of the I picture P1 and that of the B picture P2, the relation of the value of OutputI, P, Bpic≤the value of LimitI, P, Bpic holds. In any one of the processings of the I picture P1 to that of the B picture P5, however, the accumulated value of OutputI, P, Bpic does not exceed the accumulated value of LimitI, P, Bpic. Therefore, the processings of the I picture P1 to the B picture P5 are the same as the processings of the I picture P1 and the B picture P2.

The processing of the B picture P6 will be discussed. The generated code amount accumulation part 431 inputs the Outputbpic=1.0 Mbit of the B picture P6 from the encoding part 413 and calculates the accumulated value of OutputI, P, Bpic at 11.5 Mbit (Step S11). The upper limit code amount accumulation part 432 inputs the LimitBpic=0.5 Mbit of the B picture P6 from the upper limit code amount setting part 425 and calculates the accumulated value of LimitI, P, Bpic at 11.0 Mbit (Step S12). The B picture P6 is not the last frame of the 1 GOP ("NO" in Step S13).

The update ratio setting part 433 inputs the accumulated value of OutputI, P, Bpic=11.5 Mbit from the generated code amount accumulation part 431 and inputs the accumulated value of LimitI, P, Bpic=11.0 Mbit from the upper limit code amount accumulation part 432. The update ratio setting part 433 compares the accumulated value of OutputI, P, Bpic with the accumulated value of LimitI, P, Bpic (Step S14).

The accumulated value of OutputI, P, Bpic exceeds the accumulated value of LimitI, P, Bpic ("ACCUMULATED VALUE OF Output>ACCUMULATED VALUE OF Limit" in Step S15). In other words, at the point of time when encoding is completed up to the B picture P6 in the 1 GOP, the generation rate of this 1 GOP exceeds the upper limit rate. The update ratio setting part 433 outputs the update instruction to the target rate setting part 421 in order to lower the OutputTargetRate from the OutputTargetRate_1 of the current stage to OutputTargetRate_2 after the update (Step S16). The target rate setting part 421 receives the update instruction ("YES" in Step S8).

The OutputTargetRate_2 after the update is set from the OutputTargetRate_1 before the update and any one of the following equations (9) to (11). The setting methods expressed by Eqs. (9) to (11) cause the accumulated value of OutputI, P, Bpic in the whole of the 1 GOP not to exceed the accumulated value of LimitI, P, Bpic in the whole of the 1 GOP.

$$\text{OutputTargetRate\_2} = \quad (9)$$

$$\text{OutputTargetRate\_1} \times \frac{\text{LimitGOP} - \sum_{P=P1}^{P6} \text{OutputI, P, Bpic}}{\text{LimitGOP} - \sum_{P=P1}^{P6} \text{LimitI, P, Bpic}}$$

The setting method expressed by Eq. (9) will be discussed. The numerator of the update ratio is an allowed value for the accumulated value of OutputI, P, Bpic of the images in the 1 GOP which are not encoded up to the current stage. The denominator of the update ratio is the accumulated value of LimitI, P, Bpic of the images in the 1 GOP which are not encoded up to the current stage.

In this case, if the OutputTargetRate is not updated, there is a possibility that the accumulated value of OutputI, P, Bpic of the uncoded images will reach the accumulated value of LimitI, P, Bpic of the uncoded images. Therefore, there is a possibility that the accumulated value of OutputI, P, Bpic in the whole of the 1 GOP will exceed the accumulated value of LimitI, P, Bpic in the whole of the 1 GOP.

By updating the OutputTargetRate, however, it becomes easier to suppress the accumulated value of OutputI, P, Bpic of the uncoded images to the allowed value of OutputI, P, Bpic of the uncoded images. Therefore, it becomes harder for the accumulated value of OutputI, P, Bpic in the whole of the 1 GOP to exceed the accumulated value of LimitI, P, Bpic in the whole of the 1 GOP.

$$\text{OutputTargetRate\_2} = \text{OutputTargetRate\_1} \times \quad (10)$$

$$\frac{\text{LimitGOP} - \sum_{P=P1}^{P6} \text{OutputI, P, Bpic}}{\sum_{P=P1}^{P6} \text{OutputI, P, Bpic} \times \frac{6+1+1}{12+1+1+6+1+1}}$$

The setting method expressed by Eq. (10) will be discussed. The numerator of the update ratio is an allowed value for the accumulated value of OutputI, P, Bpic of the images in the 1 GOP which are not encoded up to the current stage. The denominator of the update ratio is a predicted value in this current stage for the accumulated value of OutputI, P, Bpic of the images in the 1 GOP which are not encoded up to the current stage.

In consideration of I:P:B=12:6:1, it is predicted that (the predicted value of OutputI, P, Bpic of the uncoded images): (the accumulated value of OutputI, P, Bpic of the already-encoded images)=(6+1+1):(12+1+1+6+1+1). Thus, the predicted value of OutputI, P, Bpic of the uncoded images can be obtained from the accumulated value of OutputI, P, Bpic of the already-encoded images.

In this case, if the OutputTargetRate is not updated, there is a possibility that the accumulated value of OutputI, P, Bpic of the uncoded images will reach the predicted value of OutputI, P, Bpic of the uncoded images. Therefore, there is a possibility that the accumulated value of OutputI, P, Bpic in the whole of the 1 GOP will exceed the accumulated value of LimitI, P, Bpic in the whole of the 1 GOP.

By updating the OutputTargetRate, however, it becomes easier to suppress the accumulated value of OutputI, P, Bpic of the uncoded images to the allowed value of OutputI, P, Bpic of the uncoded images. Therefore, it becomes harder for the accumulated value of OutputI, P, Bpic in the whole of the 1 GOP to exceed the accumulated value of LimitI, P, Bpic in the whole of the 1 GOP.

$$\text{OutputTargetRate\_2} = \quad (11)$$

$$\text{OutputTargetRate\_1} \times \frac{\text{LimitGOP} - \sum_{P=P1}^{P6} \text{OutputI, P, Bpic}}{\sum_{P=P3}^{P6} \text{OutputI, P, Bpic} \times \frac{6+1+1}{1+6+1+1}}$$

The setting method expressed by Eq. (11) will be discussed. The numerator of the update ratio is an allowed value for the accumulated value of OutputI, P, Bpic of the images in the 1 GOP which are not encoded up to the current stage. The denominator of the update ratio is a predicted value in this current stage for the accumulated value of OutputI, P, Bpic of the images in the 1 GOP which are not encoded up to the current stage.

In the setting method expressed by Eq. (10), in order to obtain the predicted value of OutputI, P, Bpic of the uncoded images, used is the accumulated value of OutputI, P, Bpic with respect to all the pictures P1 to P6 in the already-encoded images. In the setting method expressed by Eq. (11), in order to obtain the predicted value of OutputI, P, Bpic of the uncoded images, used is the accumulated value of OutputI, P, Bpic with respect to the pictures P3 to P6 in the already-encoded images, each of which the value of OutputI, P, Bpic exceeds the value of LimitI, P, Bpic.

In consideration of I:P:B=12:6:1, it is predicted that (the predicted value of OutputI, P, Bpic of the uncoded images): (the accumulated value of OutputI, P, Bpic of some of the already-encoded images)=(6+1+1):(1+6+1+1). Thus, the predicted value of OutputI, P, Bpic of the uncoded images can be obtained from the accumulated value of OutputI, P, Bpic of some of the already-encoded images.

In this case, if the OutputTargetRate is not updated, there is a possibility that the accumulated value of OutputI, P, Bpic of the uncoded images will reach the predicted value of OutputI, P, Bpic of the uncoded images. Therefore, there is a possibility that the accumulated value of OutputI, P, Bpic in the whole of the 1 GOP will exceed the accumulated value of LimitI, P, Bpic in the whole of the 1 GOP.

By updating the OutputTargetRate, however, it becomes easier to suppress the accumulated value of OutputI, P, Bpic of the uncoded images to the allowed value of OutputI, P, Bpic of the uncoded images. Therefore, it becomes harder for the accumulated value of OutputI, P, Bpic in the whole of the 1 GOP to exceed the accumulated value of LimitI, P, Bpic in the whole of the 1 GOP.

The target rate setting part 421 resets the OutputTargetRate (Step S5). The target code amount setting part 424 resets the TargetIpic, the TargetPpic, and the TargetBpic of the images in the 1 GOP which are not encoded up to the current stage (Step S6). The quantization step value setting part 426 resets the QstepIpic, the QstepPpic, and the QstepBpic of the images in the 1 GOP which are not encoded up to the current stage (Step S7).

In the processings of the P picture P7 and the B picture P8, Step S11, Step S12, Step S13 ("NO" in this case), Step S14, and the Step S15 ("ACCUMULATED VALUE OF Output≤ACCUMULATED VALUE OF Limit" in this case) are executed. The target rate setting part 421 receives neither the update instruction nor the end instruction ("NO" in Step S8 and "NO" in Step S9).

In the processing of the B picture P9, Step S11, Step S12, Step S13 ("YES" in this case), and the Step S17 are executed. The target rate setting part 421 does not receive the update instruction ("NO" in Step S8) but receives the end instruction ("YES" in Step S9). The initialization part 42 and the update setting part 43 complete the operation for the 1 GOP shown in FIG. 3 and start the operation for another GOP.

SUMMARY OF THE PRESENT INVENTION

The upper limit rate setting part 422 sets the upper limit rate which is an upper limit value of the output rate, taking the transmission load of the image transmission system into consideration. The target rate setting part 421 sets the target rate which is a target value of the output rate, taking the upper limit rate into consideration. The upper limit code amount setting part 425 sets the upper limit amount of codes of each of the pictures in 1 GOP. The target code amount setting part 424 sets the target amount of codes of each of the pictures in 1 GOP.

The generated code amount accumulation part 431 adds up the amounts of generated codes of images in 1 GOP which are encoded up to the current stage. The upper limit code amount accumulation part 432 adds up the upper limit amounts of codes of the images in 1 GOP which are encoded up to the current stage. The update ratio setting part 433 compares the accumulated amount of generated codes and the accumulated upper limit amount of codes.

When the accumulated amount of generated codes exceeds the accumulated upper limit amount of codes, the update ratio setting part 433 sets an update ratio less than 1 and outputs the update instruction for the target rate. The target rate setting part 421 lowers the target rate. When the accumulated amount of generated codes does not exceed the accumulated upper limit amount of codes, the update ratio setting part 433 does not set the update ratio less than 1 nor output the update instruction for the target rate. The target rate setting part 421 maintains the target rate.

The transcoder 1 can predict in advance that there is a possibility of overflow before the overflow actually occurs. The transcoder 1 can predict in advance whether or not there is a possibility of overflow concurrently with the encoding of the image data which is performed by using one path, without prefetching the image data by using two paths.

Though the initialization part 42 and the update setting part 43 adopt 1 GOP as a unit of processing in the above discussion, 1 scene or the like may be adopted as a unit of processing. Though the update setting part 43 adopts 1 frame as a unit of accumulation of the amounts of codes, 1 field or the like may be adopted as a unit of accumulation of the amounts of codes.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A transcoder comprising:
 a decoder that decodes an input image to generate a decoded image; and
 an encoder that encodes the decoded image to generate an output image, the output image including a predetermined image unit composed of a plurality of images, said encoder including:
 an upper limit rate setting part that sets an upper limit rate which is an upper limit value of an output rate;
 a target rate setting part that sets a target rate which is a target value of said output rate;
 a partial code amount comparison part that compares an amount of partially generated codes with an upper limit amount of partial codes, the amount of partially generated codes being an accumulated value of an output code amount of one or more of a plurality of types of pictures in a group of pictures (GOP) of an encoded image of the predetermined image unit that have already been encoded, the upper limit amount of partial codes being an accumulated value of each upper limit value of each of the plurality of types of pictures in the GOP that have already been encoded for the output code amount of the encoded image of the predetermined image unit; and
 a target rate resetting part that resets said target rate upon determination that said amount of partially generated codes exceeds said upper limit amount of partial codes, to thereby cause a generation rate after resetting said target rate not to exceed said upper limit rate.

2. The transcoder according to claim 1, wherein said upper limit rate setting part includes:
 a processing device limit rate setting part that sets said upper limit rate based on an image storage capacity and an image processing speed of a device that processes said output image.

3. The transcoder according to claim 1, wherein said upper limit rate setting part includes:
 a transmission path limit rate setting part that sets said upper limit rate based on an image transmission rate of said output image in a transmission path.

4. The transcoder according to claim 1, further comprising:
 an upper limit code amount setting part that sets the upper limit amount of codes, which is an upper limit value of the amount of outputted codes per predetermined unit of image, based on said upper limit rate,
 wherein
 said target rate resetting part includes:
 an image unit target rate resetting part that resets said target rate upon determination that said amount of partially generated codes exceeds said upper limit amount of partial codes, to thereby cause the amount of generated codes, which is a measured value of the amount of outputted codes per said predetermined unit of image not to exceed said upper limit amount of codes.

5. The transcoder according to claim 4, wherein said image unit target rate resetting part includes an update ratio setting part that sets an update ratio of said target rate after resetting with respect to said target rate before resetting as a ratio, said ratio being a first value divided by a second value, wherein
 the first value is said upper limit amount of codes minus said amount of partially generated codes, and
 the second value is said upper limit amount of codes minus said upper limit amount of partial codes.

6. The transcoder according to claim 4, wherein said image unit target rate resetting part further includes:
 a predicted partial code amount prediction part that predicts the predicted amount of partial codes, which is a predicted value of the amount of outputted codes of uncoded images per said GOP, and
 an update ratio setting part that sets an update ratio of said target rate after resetting with respect to said target rate before resetting as a ratio of a subtraction value obtained by subtracting said amount of partially generated codes from said upper limit amount of codes with respect to said predicted amount of partial codes.

7. The transcoder according to claim 4, further comprising:
an image composition detection part that detects composition of any type image per said predetermined unit of image;
a target code amount setting part that sets the target amount of codes, which is a target value of said amount of outputted codes per said predetermined unit of image, based on said target rate; and
a code amount ratio setting part that sets a code amount ratio of any type image per said predetermined unit of image, wherein
said upper limit code amount setting part includes:
an any-type image upper limit code amount setting part that sets the upper limit amount of any-type image codes, which is an upper limit value of the amount of outputted codes of any type image based on said composition and said code amount ratio of any type image per said predetermined unit of image, and
said target code amount setting part includes:
an any-type image target code amount setting part that sets the target amount of any-type image codes, which is a target value of the amount of outputted codes of any type image based on said target amount of codes, said composition and said code amount ratio of any type image per said predetermined unit of image.

8. The transcoder according to claim 7, further comprising:
a motion amount detection part that detects the amount of motion of a decoded image, which indicates the degree of the motion of said decoded image, wherein
said code amount ratio setting part includes:
a motion estimation code amount ratio setting part that sets a code amount ratio of any type image based on the amount of motion of said decoded image.

9. The transcoder according to claim 8, wherein
the amount of motion of said decoded image includes a standardized value obtained by dividing a sum value of the lengths of motion vectors in all blocks of said decoded image by the number of all blocks in said decoded image.

10. The transcoder according to claim 8, wherein
the amount of motion of said decoded image includes a standardized value obtained by dividing a sum value of the amounts of codes of motion vectors in all blocks of said decoded image by the number of all blocks in said decoded image.

* * * * *